United States Patent
Kwatra et al.

(10) Patent No.: US 8,768,048 B1
(45) Date of Patent: Jul. 1, 2014

(54) SYSTEM AND METHOD FOR EXPLOITING SEGMENT CO-OCCURRENCE RELATIONSHIPS TO IDENTIFY OBJECT LOCATION IN IMAGES

(75) Inventors: Vivek Kwatra, Santa Clara, CA (US); Jay Yagnik, Santa Clara, CA (US); Alexander T. Toshev, San Francisco, CA (US); Poonam Suryanarayan, State College, PA (US)

(73) Assignee: Google Inc., Mountain View, CA (US)

( * ) Notice: Subject to any disclaimer, the term of this patent is extended or adjusted under 35 U.S.C. 154(b) by 191 days.

(21) Appl. No.: 13/299,789

(22) Filed: Nov. 18, 2011

(51) Int. Cl.
*G06K 9/62* (2006.01)
(52) U.S. Cl.
USPC .......................................... 382/159; 382/225
(58) Field of Classification Search
USPC .................... 382/159, 173, 181, 225
See application file for complete search history.

(56) References Cited

U.S. PATENT DOCUMENTS

| | | | | |
|---|---|---|---|---|
| 6,909,914 | B2 * | 6/2005 | Pedrizzetti et al. | 600/407 |
| 7,440,586 | B2 * | 10/2008 | Avidan | 382/103 |
| 8,457,406 | B2 * | 6/2013 | Doretto et al. | 382/181 |
| 2007/0133885 | A1 * | 6/2007 | Jeong et al. | 382/228 |
| 2009/0003698 | A1 * | 1/2009 | Milward et al. | 382/171 |
| 2010/0172591 | A1 * | 7/2010 | Ishikawa | 382/224 |

OTHER PUBLICATIONS

Grundmann, M., et al., "Efficient Hierarchical Graph-Based Video Segmentation", Computer Vision and Pattern Recognition (CVPR 2010).

* cited by examiner

*Primary Examiner* — Daniel Mariam
(74) *Attorney, Agent, or Firm* — Lowenstein Sandler LLP

(57) ABSTRACT

A computing device segments an image into a plurality of segments, wherein each segment of the plurality of segments comprises a set of pixels that share visual characteristics. The computing device then determines expected contexts for the segments, wherein an expected context for a segment comprises at least one of additional segments or features expected to occur in the image together with the segment. The computing device then identifies a probable object based on the expected contexts.

32 Claims, 10 Drawing Sheets

SYSTEM AND METHOD FOR EXPLOITING SEGMENT CO-OCCURRENCE RELATIONSHIPS TO IDENTIFY OBJECT LOCATION IN IMAGES

TECHNICAL FIELD

Embodiments of the present invention relate to the field of image recognition and, more particularly, to a technique of performing object detection based on co-occurrence of segments in training images.

BACKGROUND

A digital image is generally a representation of a real image (e.g., a photograph) in a format which may be processed by a computer system. A digital image generally comprises a plurality of picture elements (e.g., pixels) arranged in a two-dimensional array. Each pixel may have a color and/or a color value associated with the pixel. Information associated with the location and color of each pixel may be stored and/or used by a computer system to display the digital image.

Image analysis systems are designed to extract information from an image and determine properties of the image from the extracted information. A common task for image analysis is to identify and classify objects in images. Object detection is the task of ascertaining that a set of pixels in an image is associated with a particular object. Object recognition is the task of identifying what the object is (e.g., a car, a tree, etc.). For example, object recognition techniques may be used to identify that an image includes a car and a road, or that an image contains a tree and a person. There are multiple techniques for performing object detection and object recognition. However, current object detection and object recognition techniques still fail to accurately recognize objects or misclassify objects in many instances.

SUMMARY

In an embodiment of the present invention, a computing device segments an image into a plurality of segments. Each segment of the plurality of segments may have a segment location and a set of pixels that share visual characteristics. The computing device determines expected contexts for the segments, wherein an expected context for a segment comprises at least one of additional segments or features expected to occur in the image together with the segment. The computing device then identifies a probable object based on the expected contexts.

In one embodiment, determining an expected context for a segment comprises identifying, in a data structure, an entry that includes visual characteristics that most closely match visual characteristics of the segment, wherein the expected context is associated with the entry. In one embodiment, the data structure is associated with a particular object class. In such an embodiment, identifying a probable object based on the expected context using the data structure further comprises determining that the probable object has the particular object class.

In one embodiment, determining an expected context for a segment comprises determining a bounding box predicted by the segment and determining at least one of additional segments or features expected to occur in the bounding box together with the segment. In one embodiment, identifying the probable object based on the expected contexts comprises determining a degree of overlap between the expected contexts of the segments and identifying the probable object in response to determining that the degree of overlap exceeds a threshold.

In one embodiment, segmenting the image comprises performing a hierarchical segmentation of the image, wherein first segments are components of a second segment higher in a segmentation hierarchy. Additionally, determining an expected context for the first segments comprises, for each first segment, determining other segments expected to be components of the second segment together with the first segment. In one embodiment, the expected context for a segment further comprises probabilities that the additional segments or features will occur in the image together with the segment. Additionally, identifying the probable object based on the expected contexts comprises combining the probabilities of the expected contexts for the segments.

In one embodiment, the computing device determines a subset of the plurality of segments that have overlapping contexts, wherein the subset of the plurality of segments predicts the probable object. The computing device further verifies the probable object based on performing object recognition using the subset of the plurality of segments.

In one embodiment, a computing device receives a training set of images. The computing device then segments images of the training set, wherein segments comprise sets of pixels that share visual characteristics. The computing device determining contexts of the segments, wherein a context for a segment comprises at least one of additional segments or features that occurred in an image of the training set together with the segment. The computing device clusters the segments to determine prototypical segments. The computing device then generates a data structure based on the clustering, wherein entries in the data structure represent the prototypical segments and comprise expected contexts for the prototypical segments, wherein the data structure is usable to identify probable objects in additional images.

In one embodiment, the data structure is a codebook, wherein each entry in the data structure is a code word for a prototypical segment, and wherein each code word comprises a sparse vector of additional prototypical segments that identifies which of the additional prototypical segments are expected to occur in images together with the prototypical segment. In one embodiment, the computing device generates a plurality of data structures, wherein each data structure is for a different object class. In one embodiment, for each segment, the computing device determines probabilities for additional segments to occur in images together with the segment. The computing device then weights the additional segments in a context for a segment based on the probabilities.

In additional embodiments, methods for performing the operations of the above described embodiments are also implemented. Additionally, in embodiments of the present invention, a computer readable storage media stores methods for performing the operations of the above described embodiments.

BRIEF DESCRIPTION OF THE DRAWINGS

The present invention will be understood more fully from the detailed description given below and from the accompanying drawings of various embodiments of the invention.

DETAILED DESCRIPTION

A system and method for performing object detection and recognition based on segment co-occurrence relationships are described. In one embodiment, the system analyzes previously classified images by breaking the images down into segments and determining contexts associated with each segment. A segment as referred to herein is an image region that consists of pixels with common characteristics. Example segments might include a region of blue pixels, a region of red pixels, and so on. A context for a segment can include other segments expected to occur in images together with the segment, image features expected to occur in images together with the segment, bounding boxes that the segment is expected to be inside, and other information. The system may then generate a data structure (e.g., a codebook) having entries that contain segment clusters or prototypical segments and their contexts. A segment cluster is a combination of similar segments across different images, resulting in a prototypical segment. When the system receives a new image, it breaks the image down into multiple segments. It then determines expected contexts for each segment by comparing the segments to the entries of the data structure. Based on this comparison, the system may determine whether multiple segments share the same or similar expected contexts. If multiple segments in the new image share the same or similar expected contexts, then these segments are likely to be part of the same object. Accordingly, a probable object may be identified.

Object detection presents the problem of finding a correct rectangle in an image. The number of rectangles in an image is extraordinarily large. Embodiments of the present invention may reduce the rectangles to search for an object to a very small number of rectangles. Accordingly, embodiments of the present invention provide an accurate and computationally inexpensive technique for performing object detection and/or object recognition. Embodiments of the present invention may be used to search images and/or to categorize or classify images. For example, embodiments of the present invention may be used to find images with objects in specified configurations, to find images having specified objects, and so on.

Note that embodiments of the present invention are described with reference to images. However, embodiments of the present invention also apply to videos. For example, embodiments of the present invention may perform object detection and object recognition for frames of a video. Alternatively, embodiments of the present invention may combine estimates over multiple frames to perform object detection and/or recognition.

Note also that embodiments of the present invention are described with reference to image segmentation. However, alternative embodiments may perform other types of perceptual grouping, such as contour detection.

Figure 1:
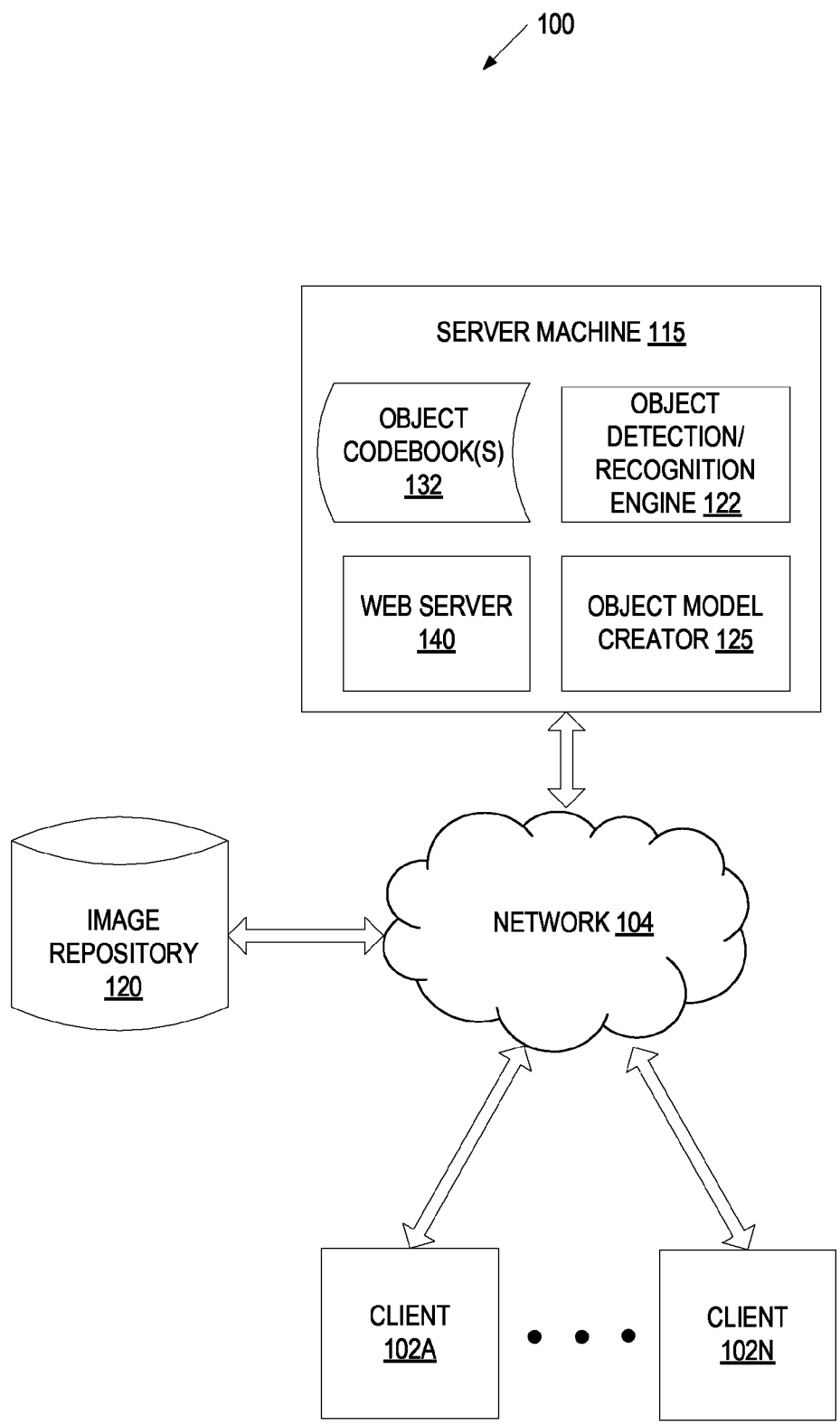
FIG. 1 illustrates an exemplary system architecture, in accordance with one embodiment of the present invention.

FIG. 1 illustrates an example system architecture 100, in accordance with one embodiment of the present invention. The system architecture 100 includes a server machine 115, an image repository 120 and client machines 102A-102N connected to a network 104. Network 104 may be a public network (e.g., the Internet), a private network (e.g., a local area network (LAN) or wide area network (WAN)), or a combination thereof.

The client machines 102A-102N may be personal computers (PC), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue image search queries to the web server or may browse images and/or videos that have previously been classified. The client machines 102A-102N may also upload images to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140, an object detection/recognition engine 122 and an object model creator 125. In alternative embodiments, the web server 140, object detection/recognition engine 122 and/or object model creator 125 may run on different machines. Additionally, in some embodiments, the object detection/recognition engine 122 and object model creator 125 may be combined into a single module.

Image repository 120 is a persistent storage that is capable of storing images and/or video. As will be appreciated by those skilled in the art, in some embodiments image repository 120 might be a network-attached file server, while in other embodiments image repository 120 might be some other type of persistent storage such as an object-oriented database, a relational database, and so forth, that may be hosted by the server machine 115 or one or more different machines coupled to the server machine 115 via the network 104. The images and video stored in the image repository 120 may include user generated content that is uploaded by client machines. The images and video may additionally or alternatively include content provided by service providers such as news organizations, publishers, libraries and so on.

Web server 140 may serve images from image repository 120 to clients 102A-102N. Web server 140 may receive image search queries and perform searches on the images in the image repository 120 to determine images that satisfy the image search query. Web server 140 may then send to a client 102A-102N those images that match the search query.

In order for the image repository 120 to be searchable, the images in the image repository 120 may be classified. In one embodiment, object detection/recognition engine 122 classifies the images 126 in the image repository 120. Classifying the images may include performing object detection on the images (identifying the locations of objects in the images) as well as performing object recognition on the objects (determining object classes for those detected objects). The images may then be classified based on the objects that the images contain.

In one embodiment, the object detection/recognition engine 122 uses one or multiple object codebooks 132 or other data structures to detect objects in images and/or recognize the objects. The object detection/recognition engine 122 operates based on segments within an image. An object codebook is a data structure that contains a set of code words that may be used to define an object. Each code word may be an entry in the codebook that represents a prototypical segment (or segment cluster) that objects of a particular object class might include or that objects of any object class might include. Examples of object classes include a car, a tree, a person, a face, a building, and so forth.

A code word in the object codebook 132 corresponds to a set of features that make up a prototypical segment for a specific object class or for objects of any object class. In particular, a code word is associated with a context for a prototypical segment. The context for a segment includes additional segments and/or features that commonly occur in images together with that segment. In one embodiment, entries additionally include bounding boxes, which may be included in the context for a segment. Bounding boxes may be included in contexts, for example, if a segment co-occurrence relationships based on bounding boxes are used. If a single object codebook 132 is used, then entries in the object codebook may be used to find objects of any object class. Thus, the object codebook may be used to perform object detection on all types of objects. However, if multiple object codebooks are used, each object codebook 132 may be associated with a particular object class and may be used to find objects of the specific object class in the images. If a probable object is identified using an object codebook for a specific object class, then it can be decided that the identified probable object has the specific object class. Thus, the multiple object codebooks may be used to perform both object detection and object recognition. Note that in alternative embodiments, other data structures than codebooks may be used, such as tables or collections of key value pairs.

To identify an object in an image, object detection/recognition engine 122 may segment the image and determine segments of the image that match entries for prototypical segments in an object codebook. The object detection/recognition engine 122 may then determine expected contexts associated with the segments, and determine similarities between the expected contexts. If multiple segments have similar contexts, then object detection/recognition engine 122 determines that the multiple segments are components of an object. An object class for the detected object may or may not also be identified. Once an object is identified, object recognition techniques known to those of skill in the art such as edge matching, geometric hashing, the bag of words model, etc. may be performed on the segments that make up the object to determine an object class.

To enable object detection/recognition engine 122 to identify and/or recognize objects in images, and thus to classify images, object model creator 125 pre-generates one or more object codebooks 132 or other data structures. In particular, object model creator 125 receives a training set of images. In one embodiment, each image in the training set includes a specified object and/or a specified bounding box for the object. The images from the training set may be included in the image repository 120 or may be in a separate data store. Object model creator 125 segments images from the training set and performs clustering, regression and/or vector machine learning on the segments. Segment clusters may represent prototypical segments for particular object classes or for objects in general. Each segment cluster may be used to generate an entry (e.g., a code word) in an object codebook 132. Codebook generation is discussed in greater detail below with reference to FIG. 2. Object detection and recognition using codebooks is discussed with reference to FIG. 3.

Figure 2:
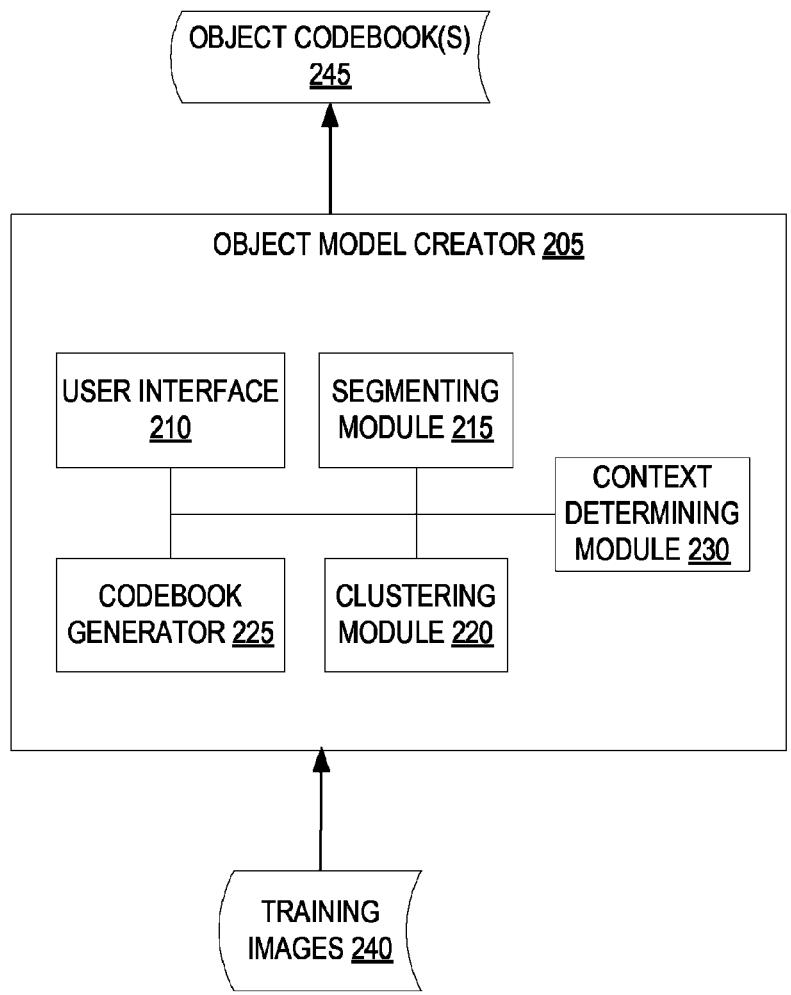
FIG. 2 is a block diagram of an object model creator, in accordance with one embodiment of the present invention.

FIG. 2 is a block diagram of an object model creator 205, in accordance with one embodiment of the present invention. The object model creator 205 includes a user interface 210, a segmenting module 215, a clustering module 220, a context determining module 230 and a codebook generator 225. Note that in alternative embodiments, the functionality of one or more of the user interface 210, segmenting module 215, clustering module 220, codebook generator 225 and/or context determining module 230 may be combined into a single module or divided into multiple modules.

Segmenting module 215 segments each image in a training set of images 240. A user (e.g., an administrator) may specify the training images 240 (e.g., by designating a location that contains the training images 240) via the user interface 210. Images may be added to the training data set as discreet files (e.g., joint photographic experts group (JPEG) files, graphics interchange format (GIF) files, portable network graphics (PNG) files, etc.) or as components of a single compressed file (e.g., a zip file).

As discussed above, a segment is region in an image that consists of pixels with similar characteristics. A characteristic may pertain to color, and may reflect color variation within a region. For example, a region of homogeneous color will remain distinct from a region having pixels of a different color. A characteristic may also pertain to other features such as intensity, texture, etc. A segment may include identifying information such as the position of the segment within an image (e.g., using "x" and "y" axes), the size and/or geometric shape of the segment, a color value (or multiple color values) associated with the segment, an intensity of the segment, a texture of the segment, and so on. In one embodiment, segments are represented as a vector with a color, a texture and/or additional image properties.

There are multiple techniques that may be used to segment images. One such technique is described herein. However, numerous other techniques for image segmentation may also be used. In one embodiment, segmenting module 215 performs filtering (e.g., bilateral filtering) of images prior to segmenting the images in order to improve the segmentation process by causing the segments to be more homogenous.

In one embodiment, segmenting module 215 generates a hierarchical segmentation of images. Higher levels of the hierarchy may describe relatively coarse segmentations of an image while lower levels of the hierarchy may describe relatively fine segmentations of the image. Segmenting parameters may affect aspects of segmentation such as the number of levels of the segmentation hierarchy and the granularity of the segmentations at the levels of the hierarchy. Segmenting module 215 may perform the hierarchical segmentation via an iterative process, where each iteration produces a segmentation for a level of the segmentation hierarchy.

During a first segmentation iteration, segmenting module 215 may generate a segmentation graph, where nodes of the segmentation graph contain a single pixel. Segmenting module 215 may then use an intensity of that single pixel as a descriptor for the node. During subsequent iterations, segmenting module 215 segments a graph (e.g., the segmentation graph or a region graph) to produce a new region graph segmented into larger regions. Collectively, the set of graphs form a hierarchy, with each level of the hierarchy having a graph with a different segmentation.

For region graphs, nodes of the region graph can contain multiple pixels. For these nodes, segmenting module 215 may compute a histogram describing the colors of pixels within the region defined by the node and use the histogram as the node's descriptor or vector. In one embodiment, the histogram describes the red/green/blue (RGB) intensities of the pixels within the region, though other color spaces may also be used.

The segmentation module 215 may perform the segmentation by determining the internal variation of the nodes, traversing the edges of the nodes in order of increasing weight, and evaluating whether the edge weight is smaller than the internal variation of nodes incident to the edge. If the edge weight is smaller, the nodes may be merged together and the internal variation of the compound node may be updated to the larger of the internal variations of the merged nodes. The segmentations produced by the segmenting server 112 can be used to support subsequent processing of the images (e.g., by clustering module 220).

Once the images are segmented, context determining module 230 may identify contexts of the image segments. Context determining module 230 may then associate these contexts with the appropriate segments. To determine a segment's context, context determining module 230 may identify other segments that occurred together with the segment in an image. In one embodiment, context determining module 230 determines the context using all other segments in the image. In another embodiment, context determining module 230 determines the context for a segment using only those segments that are contained in a region of the image (e.g., within the vicinity of the segment). For example, to determine the context for a segment, context determining module 230 may identify those additional segments that are within a threshold distance from the segment (e.g., within 50 pixels of the segment), those segments that are subcomponents of a larger segment along with the segment, those additional segments that occur with the segment within a bounding box, those segments that occur within a radius around the segment, and so on. In one embodiment, multiple different contexts are determined for segments. For example, an image context may be determined that includes all other segments that occur together with a segment and a bounding box context that includes only other segments that occur together with the segment in a bounding box.

Clustering module 220 performs clustering on segments from images to generate segment clusters. Each segment cluster is a group of segments that are more similar to each other than to segments from other segment clusters. In one embodiment, clustering is performed on an object class basis. Therefore, each segment cluster represents a prototypical segment for an object of a particular object class that is bounded by a bounding box. In another embodiment, clustering is performed on segments of all images, irrespective of object class. Segment clusters may be represented by a vector that may include a color, intensity, texture and/or other image properties. Segment clusters may be represented by averages of features of the segments in the segment cluster and/or by median features (e.g., median color, intensity, etc.). Segment clusters may additionally include feature value ranges. Segments having features that fall within the feature value ranges may be identified as belonging to the segment cluster.

There are numerous clustering techniques that may be used to perform the clustering. Examples of clustering techniques that may be used include clustering techniques based on connectivity models (e.g., hierarchical clustering), based on centroid models (e.g., using the k-means algorithm), based on distribution models (e.g., using multivariate normal distributions), based on density models, and based on subspace models (e.g., using biclustering).

In one embodiment, rather than expressly performing clustering, clustering module 220 may train a regression system to detect objects based on context. The regression system may identify image features or segments and linearly or non-linearly combine them to produce an output parameterization of contexts. In one embodiment, clustering module 220 uses a support vector machine (SVM) (e.g., an SVM in which a radial basis function (RBF) is used as a kernel) to train a regression system. In such an embodiment, clustering and kernel function learning becomes implicit and is done automatically as part of SVM training. In addition to using the SVM to perform clustering, the SVM may be used to directly perform context prediction.

Each segment cluster is associated with a context that identifies other segment clusters that commonly occur in the presence of the segment cluster. When a segment cluster is formed, clustering module 220 may generate a combined context for that segment cluster based on combining the contexts of all of the segments that make up the segment cluster. Each segment context may be a set of other segments. For each other segment in a context, clustering module 220 may determine a segment cluster that the other segment belongs to. Thus, clustering module 220 may transform a segment's context from a set of other segments into a set of segment clusters. Clustering module 220 may then combine, for a segment cluster, the other segment clusters from the contexts of all segments that form the segment cluster.

The combination of the contexts of segments that form a segment cluster may include a count for the number of times that each other segment cluster appeared in the contexts. For example, if a first segment cluster appeared in the contexts of segments that form a second segment cluster 5 times, then the first segment cluster may have a count of 5 in the context for the second segment cluster. In one embodiment, the context associated with a segment cluster is a histogram of other segment clusters. Alternatively, the context may be a probability distribution of other segment clusters. In another embodiment, the context associated with a segment cluster is a collection of discrete scored other segment clusters. In yet another embodiment, a threshold is applied to the segment cluster counts in the contexts. If the count for a particular segment cluster meets or exceeds the threshold, then that particular segment cluster is considered to be in the context, and is given a value of 1. If the count for a particular segment is below the threshold, then that particular segment cluster is considered not to be in the context, and is given a value of 0. In such an embodiment, the context may then be represented as a sparse vector of 1's and 0's, where each bit in the sparse vector is associated with a particular segment cluster and indicates whether that segment cluster is included in a context.

Contexts have been described with reference to co-occurrence relationships of segments. However, it should be understood that the above described techniques may also be used to determine other image features that have co-occurrence relationships with segments. For example, a determined context may include particular textures, colors or other image features. Additionally, contexts may include bounding boxes that are expected to occur together with specific segments.

Codebook generator 225 generates a codebook (or other data structure) from the segment clusters. In one embodiment, codebook generator 225 generates a single object codebook that is not object class specific. In another embodiment, codebook generator 225 generates multiple object codebooks, where each segment cluster associated with an object class is represented by a code word in a specific codebook for that object class. The code word includes the descriptor or vector that describes the segment cluster. The descriptor or vector may include a color (or color range), an intensity (or intensity range), a texture (or texture range), and so forth. Each code word additionally includes a context of the represented segment cluster. Each code word may additionally include a kernel function that can be used to assign membership of a segment to the code word (e.g., to determine whether a segment matches the code word).

The space of segment descriptors S can be large and sparse. If a bag-of-words model is used, S may include histograms of features computed by accumulating features within a segment. One approach to representing S would be to approximate it with a vocabulary of segment clusters $C=\{c\_1, c\_2, \ldots, c\_n\}$. Each segment may then be an index or sparse vector indicating which cluster it belongs to. This can be softened to include k-nearest clusters, or more generally be represented as a kernel function (a continuous, symmetric function with a positive semi-definite gram matrix that replaces a dot product between two vectors to transform a linear algorithm into a non-linear algorithm) that assigns membership of a segment to these clusters. Accordingly, descriptors may be described by the function descriptor(s):= $[K(s,c\_1), K(s,c\_2), \ldots, K(s,c\_n)]$, where K is the kernel function.

Once object codebooks 245 are generated, object model creator 205 may deploy the object codebooks 245 to servers. In one embodiment, object model creator 205 periodically recomputes the object codebooks 245. This may include invoking the segmenting module 215, the clustering module 220, the context determining module 230 and the codebook generator 225. As new images become available, those new images may be added to the training set of images. The updated training set of images may then be used to recompute the object codebooks 245. In one embodiment, the object model creator 205 uses all of the previous contents of the training set of images as well as the newly added training images 240. In another embodiment, the object model creator 205 uses only the recently added training images 240.

Figure 3:
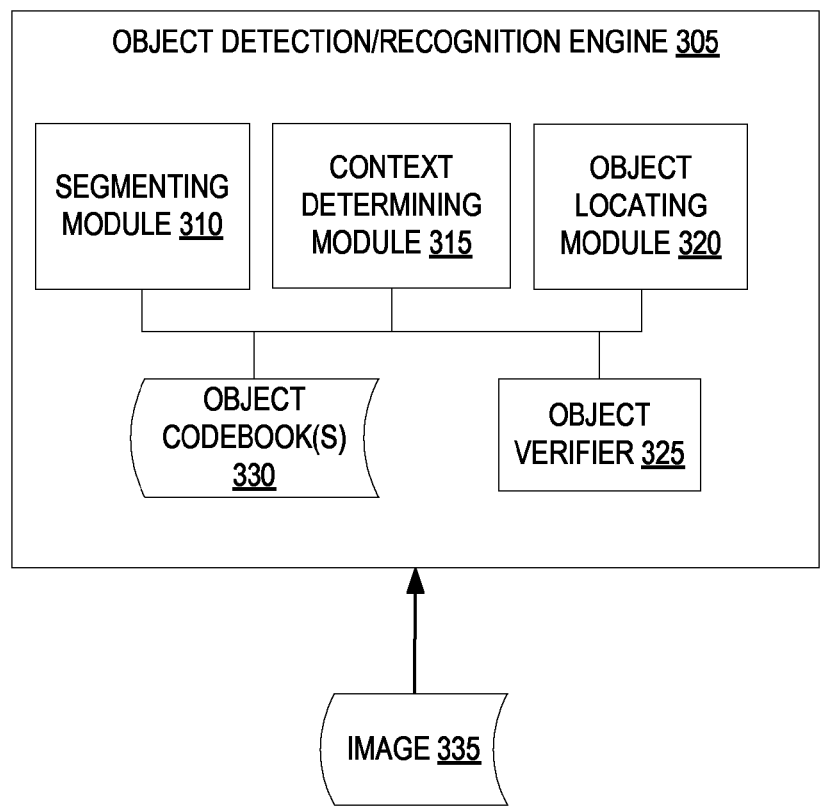
FIG. 3 is a block diagram of an object detection/recognition engine, in accordance with one embodiment of the present invention.

FIG. 3 is a block diagram of an object detection/recognition engine 305, in accordance with one embodiment of the present invention. The object detection/recognition engine 305 includes a segmenting module 310, a context determining module 315, an object locating module 320 and one or more object codebooks 330. Object detection/recognition engine 305 may also include an object verifier 325. Note that in alternative embodiments, the functionality of one or more of the segmenting module 310, context determining module 315, object locating module 320 and/or object verifier 325 may be combined into a single module or divided into multiple modules.

Object detection/recognition engine 305 is configured to perform object detection on images 335. Object detection/recognition engine 305 in some embodiments also performs object recognition on images 335. Object detection/recognition engine 305 may receive an image 335 from a remote machine such as a client machine or third party server machine. Alternatively, object detection/recognition engine 305 may access an image 335 from an image repository residing remotely or locally.

Segmenting module 310 segments an image 335 that is to be analyzed. Segmenting module 310 may segment the image using the same technique that was used to generate the object codebooks 330. Alternatively, segmenting module 310 may use a different segmenting technique to segment the image. Any of the aforementioned segmenting techniques may be used. As previously mentioned, each segment may be represented as a vector or descriptor that includes a position of the segment within an image (e.g., a position of a center pixel of the segment using "x" and "y" axes), a size and/or geometric shape of the segment, a color value (or multiple color values) associated with the segment, an intensity of the segment, a texture and/or additional image properties. Additionally, hierarchical segments may be generated, as previously described. For example, if a segment is a wheel, it may have sub-segments for a hubcap, for a tire, for tire treads, and so forth.

Context determining module 315 determines expected contexts for each of the segments of the image 335. To determine a segment's expected context, context determining module 315 compares the segment to code words in the object codebook (or object codebooks) 330. A segment may match a code word in an object codebook 330 if the segment includes features (e.g., color, texture, intensity, shape, etc.) that match features of a prototypical segment represented by the code word. A match may be an exact correspondence between features, but will usually be a correspondence within deviation thresholds. The deviation thresholds may be defined individually for each code word, or may be defined globally and apply to all code words in a codebook. In one embodiment, a kernel function associated with the code word is used to determine whether a segment is a close match to a prototypical segment of the code word.

As previously mentioned, each code word includes an expected context for a prototypical segment. This expected context may be represented as a probability distribution of other prototypical segments, as a histogram of other segments, as a collection (e.g., list) of scored segments, or as an index or sparse vector of other prototypical segments. The expected context may additionally include a set of bounding boxes, where each bounding box has a size and location relative to the prototypical segment (segment cluster) represented by a code word. Additionally, the expected context may include other expected features.

The context associated with a code word may be an image level context (that includes segments and/or features in an entire image), a distance bounded context (that includes segments and/or features within a threshold distance from a segment), a bounding box context (that includes segments and/or features within a bounding box), or a segment hierarchy context (that includes other segments that are sub-segments of a particular larger segment). In one embodiment, code words include multiple different contexts. For example, a code word may include an image level context and a bounding box context.

Object locating module 320 detects an object in the image 335 based on the combined contexts of the segments from the image 335. As discussed above, each context is a list, table, sparse vector or other combination of segments and/or features that are expected to occur together with a particular segment. Combining the contexts may include adding together values for each segment and/or feature included in the contexts. For example, if multiple contexts identified the prototypical segment of code word 4, then the values for code word 4 from those segments would be added together. Any segments that occur together frequently are likely of semantic importance, and may be included in a probable object. The more segments that are used to predict an object, the more likely that the prediction will be correct.

The combination of contexts may be a weighted or unweighted combination. A Context may be weighted, for example, based on a similarity between a segment of an image being analyzed and the matching code word associated with the context. Additionally, or alternatively, each segment and/or feature included in a context may be individually weighted. For example, if a first segment only occurs in the presence of a second segment 50% of the time, then a weight of 0.5 may be applied to that first segment in the context of the second segment.

If the contexts are represented as sparse vectors with binary values (e.g., a 1 for an expected segment/feature and a 0 for an unexpected segment/feature), then combining the contexts may include simply counting the number of contexts that expect each segment/feature occurred in (e.g., counting the number of 1's for particular segments in the sparse vectors). If the count for a segment exceeds a threshold (e.g., 5 counts), then that segment may be identified as a component of an object in the image 335. Note that the threshold may be a dynamic threshold that is determined based on the properties of an image being analyzed. In one embodiment, the threshold is a normalized threshold that is set based on the segment counts in a combined context. Object locating module 320 may determine that a probable object is composed of those segments having counts that exceed the threshold. An example illustrating this concept is provided with reference to FIGS. 4A-4C.

In one embodiment, contexts associated with code words are represented as histograms of expected segments and/or features. Each bin of a histogram may be for a particular segment or feature. The value in a histogram bin may represent the number of instances in which the segment or feature was expected in the contexts of individual segments that formed the segment cluster represented by a code word. For example, if there were 100 contexts that included a particular expected segment in a particular code word's segment cluster, then that particular expected segment may have a bin value of 100. The bin values may be normalized for uniformity between histograms.

Combining contexts may include combining bin values of each of the histograms. Segments/features associated with histogram bins having the highest bin values may then be selected as those segments and/or features that make up a probable object. In one embodiment, histogram bins having bin values that exceed a bin value threshold are included in the probable object.

In another embodiment, the contexts include probability distributions of segments. Each probability distribution identifies probabilities that particular segments occur in the presence of another segment. The contexts may be combined by summing up the probability distributions associated with each code word that matched a segment of the image. If multiple segments indicate that the probability of a particular segment is high, then the chance that the particular segment is a component of an object is high. Segments having the highest probability after combining the probability distributions may be selected as members of a probable object. Additionally, or alternatively, segments having a probability that exceeds a probability threshold may be selected as members of a probable object.

In one embodiment, given the space of all segments S, we can define the contextual representation of a given segment $s \in S$ as a function $f: S \rightarrow 2^S$, where the range of $f$ is the power-set of S. Accordingly, $f(s)$ may select a subset of segments from S to be in the context of s. This representation can be made probabilistic by defining a function $g: \forall x \in S, g(x,s) = Pr[x \in f(s)]$. This reduces $f$ to a pair wise relationship between segments through g. Given a pair x and s, g may measure if x and s can be found in the context of each other. Consider the case in which kernel functions are used to describe membership in a segment cluster (e.g., in which descriptor(s):=$[K(s,c\_1), K(s,c\_2), \ldots, K(s,c\_n)]$, where K is the kernel function and $c\_n, c\_2, \ldots, c\_n$ are segment clusters). In such an instance, we can then define $g(x; s) \propto \text{Sum}\_k \{K(s,c\_k)*g\_k(x; c\_k)*w\_k\}$, where $g\_k$ is the contextual distribution of a particular segment cluster ck and the weight $w\_k$ denotes a prior weight that measures the reliability of cluster k's contextual distribution $g\_k$. This can, for example, be based on how many of the segments in that cluster came from a true object foreground (as opposed to a background or false positive). Note that $g\_k(x; c\_k)$ itself may be expressed over other segment clusters representative of x. In one embodiment, $g\_k(x; c\_k) = \text{sum}\_m \{K(x,c\_m)* \{g\_k\}^\hat{}m(c\_m,c\_k)\}$, where $\{g\_k\}^\hat{}m$ is a measure of segments from clusters $c\_k$ and $c\_m$ occurring in the context of each other. If, for example, x denotes a segment cluster $c\_j$, then $K(x,c\_m) = \delta(c\_j = c\_m)$, and $g\_k(x,c\_k) = \{g\_k\}^\hat{}j (c\_j, c\_k)$ may be true.

As noted previously, object codebooks 330 may be a single generic object codebook or a collection of object codebooks, where each object codebook in the collection is associated with a particular object class. If a single generic object codebook is used, then the identified probable object can have any object class. If, however, multiple object codebooks are used, then the probable object will have an object class associated with the particular object codebook that was used to detect the probable object.

Once an object is detected, object verifier 325 may perform object verification and/or recognition on the detected objects. In one embodiment, object verifier 325 performs object verification using those segments that were identified as components of the probable object. For example, object verifier 325 may perform object recognition using just those segments that had overlapping contexts (e.g., if the context of segment A included segment B and the context of segment B included segment A, then segment A and B may be identified as components of the same object).

Object verifier 325 extracts image features (e.g., performs segmentation) and performs image classification or object recognition on the portion of the image that contains the segments. Any of the image classification and/or object recognition techniques known in the art may also be used. Performing image classification or object recognition on just the identified segments is much simpler than performing image classification or object recognition on the entire image. Therefore, well known techniques for performing these operations can be performed with increased accuracy and speed due to reduced complexity.

Note that embodiments of the present invention may be used to identify both static and dynamic objects. In an embodiment that identifies dynamic objects, the context for a prototypical segment would either include or be based on articulated motion models that model articulation restraints for motions about the prototypical segments. Such a context may enable the identification of dynamic objects. For example, such contexts may be used to identify that if a person's hand is in a particular position, then other parts of the person's body may be in particular positions. Entries in the contexts may include both those other prototypical segments that are expected to occur near the user's hand as well as positions at which those prototypical segments are expected to occur. Thus, embodiments of the present invention may be used to perform constrained reasoning for an articulated object.

Note also that embodiments of the present invention have been described with reference to using co-occurrence relationships of segments and features to identify objects. However, it should be understood that embodiments of the present invention may also be used to verify objects by taking advantage of co-occurrence relationships of different objects in images. For example, a road object may frequently occur in images together with a car object. The techniques described herein can be used to determine contexts for specific objects and to determine whether the different objects have contexts that agree with one another (e.g., have a degree of overlap that exceeds a threshold).

Figure 4:
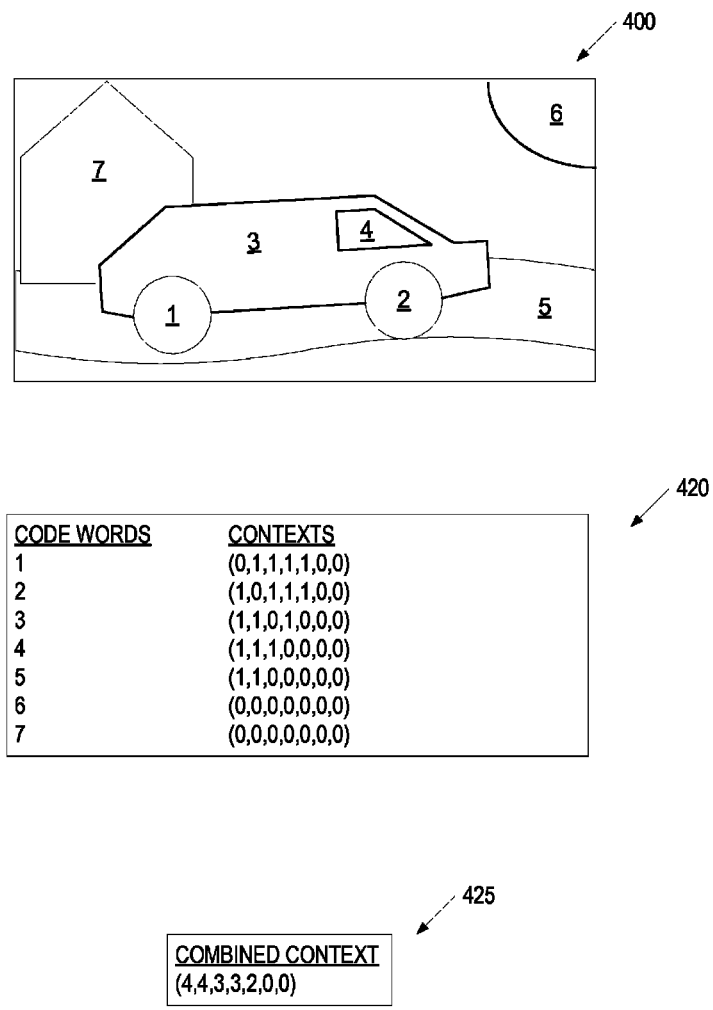
FIG. 4 illustrates an example segmented image, an example codebook, and an example combined context, in accordance with one embodiment of the present invention.

FIG. 4 illustrates an example segmented image 400, an object codebook 420 and a combined context 425, in accordance with one embodiment of the present invention. The segmented image 400 includes segments 1-7. Each segment 1-7 corresponds to a code word 1-7 in object codebook 420. Each code word 1-7 in the object codebook 420 is associated with a particular context, which is represented as a sparse vector. Each entry in a sparse vector is for a particular code word in the codebook 420. For example, a first entry is associated with code word 1, a second entry is associated with code word 2, and so on. The context for code word 1 has the form (0,1,1,1,1,0,0), indicating that the prototypical segment associated with code word 1 is expected to occur together with prototypical segments of code words 2, 3, 4 and 5. Similarly, the context for code word 2 has the form (1,0,1,1, 1,0,0), indicating that the prototypical segment associated with code word 2 is expected to occur together with prototypical segments of code words 1, 3, 4 and 5.

Combined context 425 is generated by combining contexts for code words 1-7. The combined context may be an unweighted sum, a histogram (which may be normalized) or a weighted sum. The illustrated combined context 425 is an unweighted sum of contexts. In the combined context 425, code word 1 was expected by 4 segments, code word 2 was expected by 4 segments, code word 3 was expected by 3 segments, code word 4 was expected by 4 segments and code word 5 was expected by 2 segments. If a threshold of 3 is used as a cutoff for members of a probable object, then combined context 425 predicts a probable object that includes code words 1, 2, 3 and 4. Thus, embodiments of the present invention are essentially filtering out background data (e.g., segments 5, 6 and 7). We can see that segments 1, 2, 3 and 4 (corresponding to code words 1, 2, 3 and 4) are the components of a car.

FIGS. 5-9 are flow diagrams of various embodiments of methods for generating data structures for performing object detection and for using such data structures to perform object detection. The methods are performed by processing logic that may comprise hardware (circuitry, dedicated logic, etc.), software (such as is run on a general purpose computer system or a dedicated machine), or a combination of both. In one embodiment, the methods are performed by the server machine 115 of FIG. 1. The methods of FIG. 5-6 may be performed by an object model creator 125 running on server machine 115 or another machine. The methods of FIGS. 7-9 may be performed by an object detection/recognition engine 122 running on the server machine 115 or an additional machine. Note that the object detection/recognition engine 122 and the object model creator 125 may run on separate machines.

Figure 5:
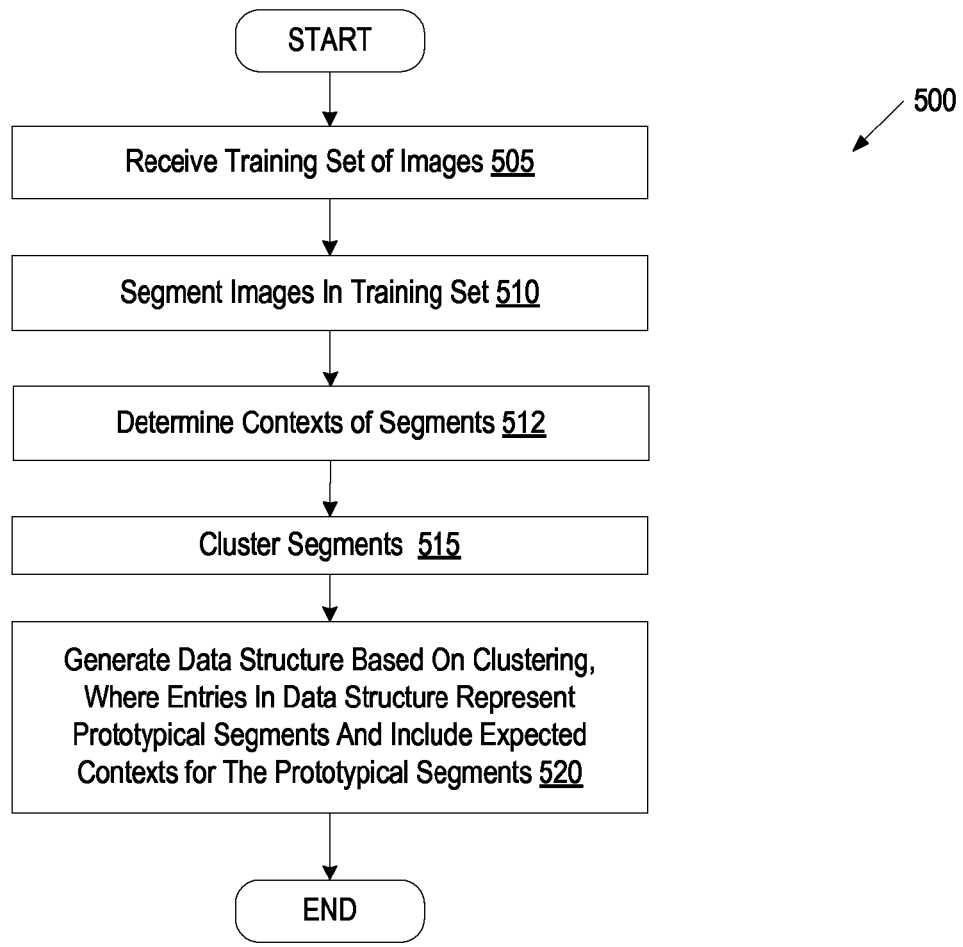
FIG. 5 is a flow diagram illustrating one embodiment for a method of generating a data structure for performing object detection.

FIG. 5 is a flow diagram illustrating one embodiment for a method 500 of generating a data structure for performing object detection. In one embodiment, the generated data structure is a codebook. Alternatively, the data structure may be a table, list, collection of key value pairs, or other type of data structure. At block 505 of method 500, processing logic receives a training set of images. Images in the training set may or may not be classified as containing objects of particular object classes. Images may additionally have predefined bounding boxes that bound objects of specific object classes.

At block 510, processing logic segments the images in the training data set. Any segmenting technique known in the art of image processing may be used to perform the segmentation. In one embodiment, a hierarchical segmentation technique is performed, as previously described. Generated segments may be associated with a bounding box that bounds the segment.

At block 512, processing logic determines contexts of the segments. The determined context for a segment may be a global context that includes all segments and/or features that occur in an image along with the segment. Alternatively, the determined context may be confined to a region of the image. For example, a context for a segment may include other segments and/or features that occur within a specified distance from the segment. Alternatively, a context for a segment may include other segments that occur together with the segment inside of a bounding box. Similarly, a context for a segment that is a sub-segment of a larger segment may include other segments that are also sub-segments of the larger segment. In one embodiment, a context for a segment is a sparse vector of other segments from the image that contains the segment.

At block 515, processing logic clusters the segments in the training data set. In one embodiment, processing logic clusters segments that are associated with the same object class. Alternatively, segments may be clustered without regard to associated object classes. Any of the previously discussed clustering techniques may be used to perform the clustering. A result of the clustering may be a collection of segment clusters, where each segment cluster includes visual characteristics (also referred to as features) such as color, intensity, size, texture, etc. of a prototypical segment. Segment clusters may be associated with a kernel function that may be used to identify membership in the segment cluster. Segment clusters may initially be associated with collections of contexts from the segments used to form the segment clusters. After the clustering, processing logic may convert the contexts to include expected segment clusters (or prototypical segments) rather than expected individual segments (e.g., from a single image).

At block 520, processing logic generates a data structure based on the clustering. Entries in the data structure include visual characteristics for prototypical segments (or segment clusters) of objects having the object class. Entries in the data structure additionally include contexts for the segment clusters. The contexts for the segment clusters include those segment clusters that are expected to occur together with a specific segment cluster in an image. Entries in the data structure may additionally include kernel functions.

Figure 6:
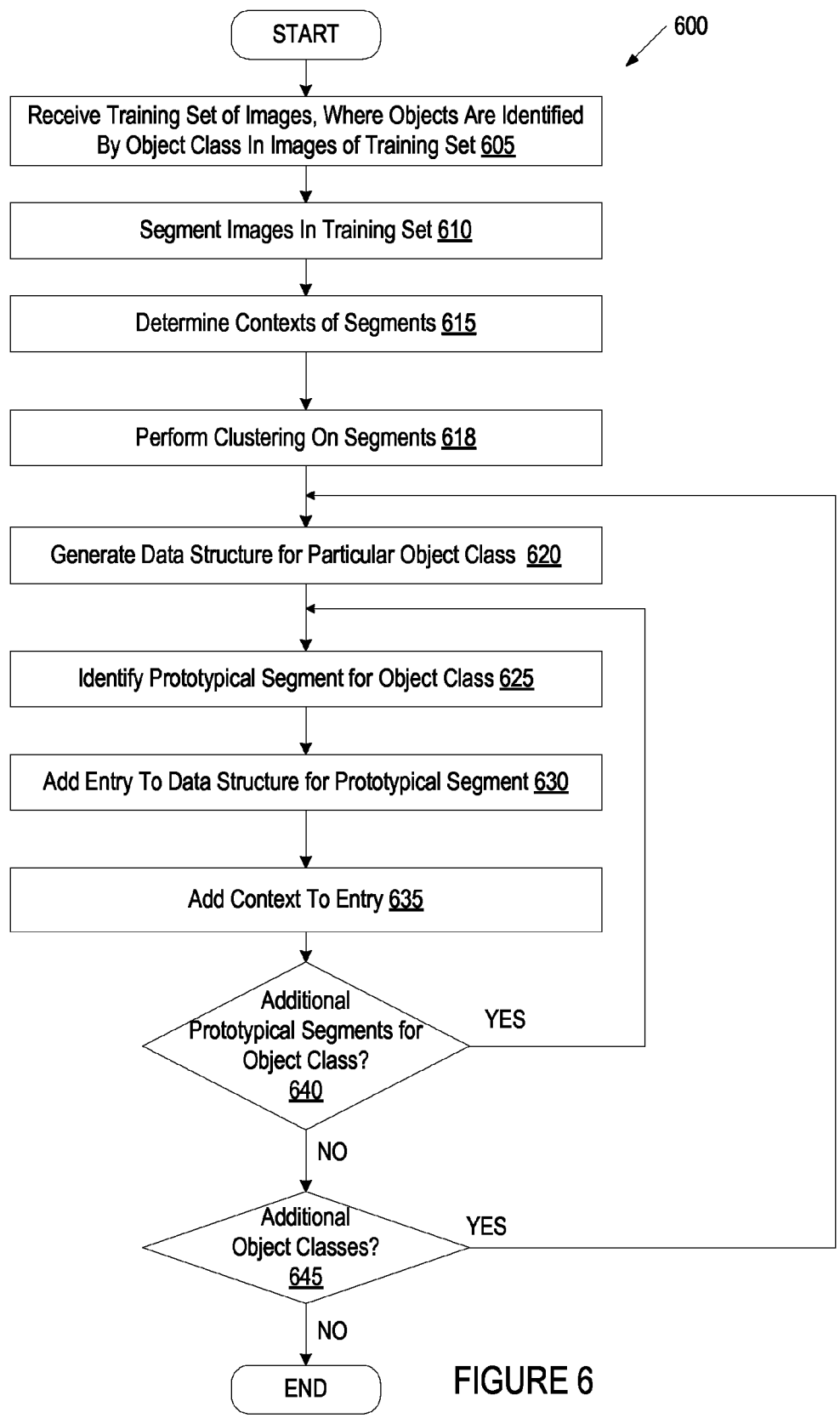
FIG. 6 is a flow diagram illustrating one embodiment for a method of generating a set of data structures for performing object detection.

FIG. 6 is a flow diagram illustrating another embodiment for a method 600 of generating a data structure for performing object detection. At block 605 of method 600, processing logic receives a training set of images. Each of the images includes objects that are identified by object class. At block 610, processing logic segments the images in the training set. At block 615, processing logic determines the contexts of the segments.

At block 618, processing logic clusters the segments from the training set of images. At block 620, processing logic generates a data structure for a particular object class. At block 625, processing logic identifies a prototypical segment for the object class, where the prototypical segment is a segment cluster generated at block 618. At block 630, processing logic adds an entry to the data structure for the prototypical segment. At block 635, processing logic adds a context to the entry. The added context identifies expected prototypical segments (segment clusters) and/or features that are expected to occur together with the identified prototypical segment in an image (or in a region of an image).

At block 640, processing logic determines whether there are any additional prototypical segments for the object class. If there are additional prototypical segments that do not yet have entries in the codebook, the method returns to block 620. If all prototypical segments for the object class have been added to the data structure, the method proceeds to block 645.

At block 645, processing logic determines whether there are any additional object classes for which data structures have not been created. If there are additional object classes, the method returns to block 620. Otherwise the method ends.

Figure 7:
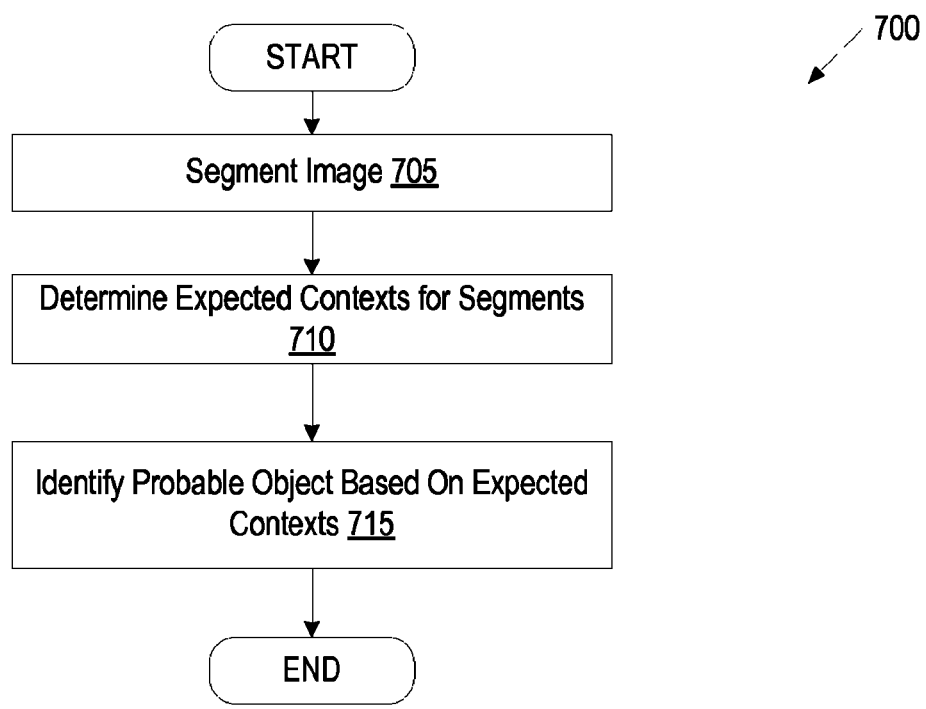
FIG. 7 is a flow diagram illustrating one embodiment for a method of performing object detection based on segment co-occurrence relationships.

FIG. 7 is a flow diagram illustrating one embodiment for a method 700 of performing object detection based on segment co-occurrence relationships. At block 705 of method 700, processing logic segments an image as previously described. At block 710, processing logic determines expected contexts for the segments. Expected contexts can be determined by finding entries in a data structure that match the segment within a deviation threshold (e.g., using kernel functions associated with the entries), where the matching entries are associated with contexts. In one embodiment, a code book is used to determine the expected contexts.

At block 715, processing logic identifies a probable object based on the expected contexts. The probable object may be identified by determining similarities or overlap between the contexts. In one embodiment, processing logic combines the expected contexts for the segments and then counts reoccurrence of expected segments or features included in the expected contexts. Those segments and/or features that are included in the most contexts may be identified as components of a probable object. The more overlap between the contexts of segments or features, the higher the likelihood that the probable object is in the image.

Figure 8:
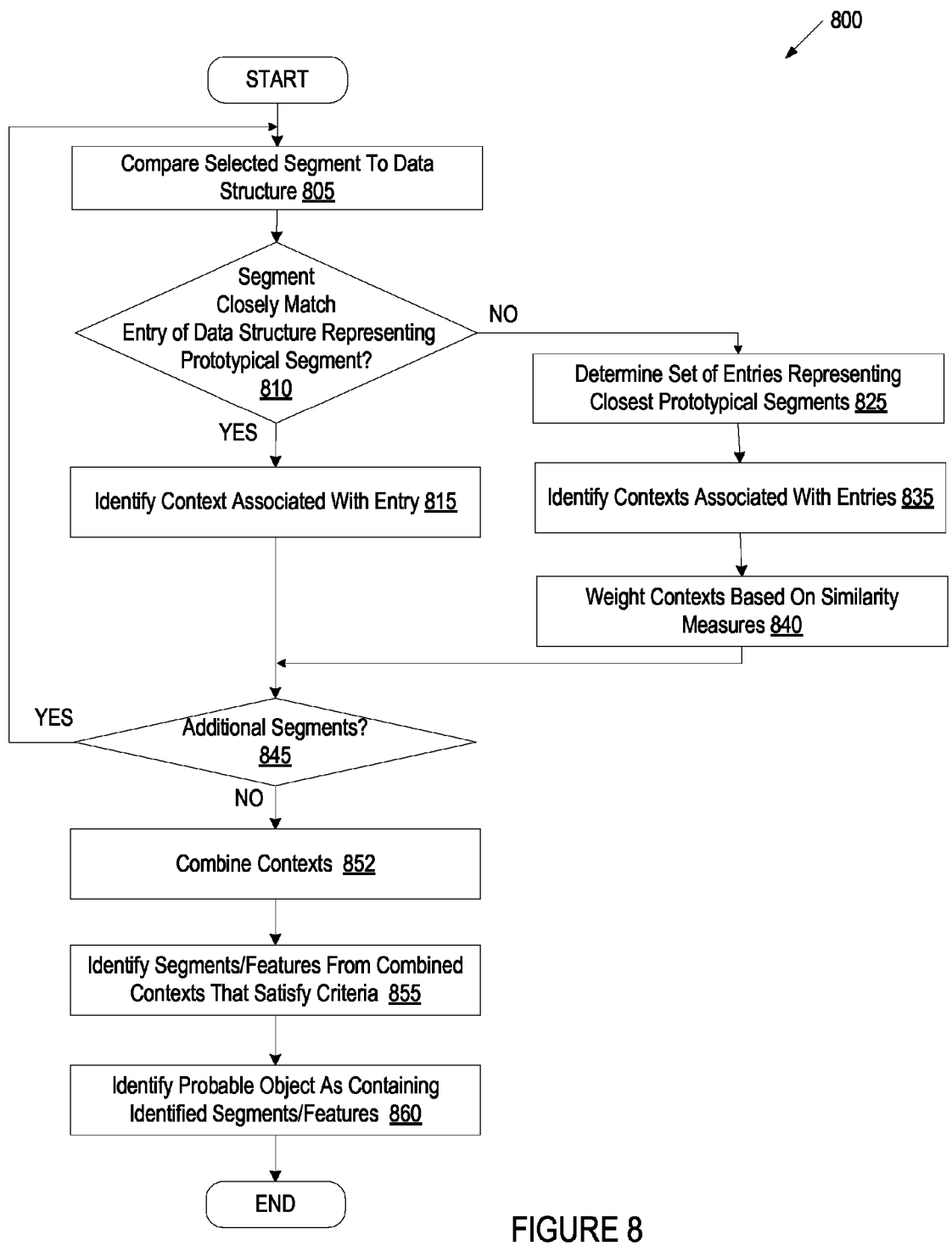
FIG. 8 is a flow diagram illustrating another embodiment for a method of performing object detection based on segment co-occurrence relationships.

FIG. 8 is a flow diagram illustrating another embodiment for a method 800 of performing object detection based on segment co-occurrence relationships. In one embodiment, method 800 is performed by blocks 710 and/or 715 of method 700. At block 805 of method 800, processing logic compares a selected a segment of an image to a data structure (e.g., to a codebook). The segment may have been determined through performing segmentation on the image.

At block 810, processing logic determines whether the segment closely matches an entry of the data structure, where the entry represents a prototypical segment. In one embodiment, the segment is determined to closely match an entry if a descriptor or vector that describes the segment is within a threshold deviation from a descriptor or vector that describes the prototypical segment associated with an entry. Vectors for segments and prototypical segments may have values for color, intensity, texture, shape, size, and/or other features. In one embodiment, the difference between two segments may be computed as the Euclidian distance between the vectors for those segments. If the Euclidean distance between a segment's vector and a prototypical segment's vector exceeds a distance threshold, then processing logic may determine that the segment and the prototypical segment do not closely match. In alternative embodiments, other similarity measures representing differences between two segment vectors may be computed. If the segment does not closely match any entry in the data structure, the method proceeds to block 825. If the segment does closely match an entry, the method continues to block 815 and processing logic identifies a context associated with the entry. The context may be a binary sparse vector, where each bit indicates whether or not a prototypical segment is in the context. Alternatively, the context may be a histogram of prototypical segments, a probability distribution of prototypical segments, or a collection of scored expected segments.

At block 825, processing logic determines a set of entries representing prototypical segments that most closely match the selected segment. To make such a determination, a Euclidean distance (or other similarity measure) between the segment's vector and a prototypical segment's vector may be computed for each entry. Entries having prototypical segments with the shortest Euclidean distances (or highest similarity measure) from the selected segment may be identified as those entries representing the closest prototypical segments.

At block 835, processing logic identifies expected contexts associated with the determined entries. In one embodiment, a group of segments can be used in conjunction to estimate the probability of expected contexts. Using conjunctions of segments to predict contexts (e.g., other segments) can help disambiguate multiple contexts that a segment can be in. At block 840, processing logic weights the contexts based on the similarity measures between the entries and the selected segment. For example, contexts associated with entries that had a short Euclidean distance between the segment's vector and a prototypical segment's vector may be assigned a high weight (e.g., 0.8), and contexts associated with entries that had a long Euclidean distance between the segment's vector and a prototypical segment's vector may be assigned a low weight (e.g., 0.4).

At block 845, processing logic determines whether there are additional segments that need to be compared to the data structure. If so, the method returns to block 805. Otherwise, the method continues to block 852.

At block 852, processing logic combines the expected contexts. If any of the contexts are weighted, then the combination may be a weighted combination of contexts. At block 855, processing logic identifies segments and/or features from the combination of contexts that satisfy a criterion or criteria. The criteria may depend on the format of the combined context. For example, if the format for the combined context is a combination of probability distributions, then the criteria may include a threshold probability. If the format of the combined context is a combination of sparse vectors having binary values, then the criteria may include a threshold integer value. In one embodiment, the threshold integer value is a dynamic value that is determined by computing an average number of instances of occurrence of segments in the combined context. The processing logic may determine the average as well as a standard deviation, and then set the threshold integer value as, for example, two standard deviations above the average.

At block 860, processing logic identifies a probable object, where the probable object contains the segments and/or features identified at block 855. The method then ends.

Figure 9:
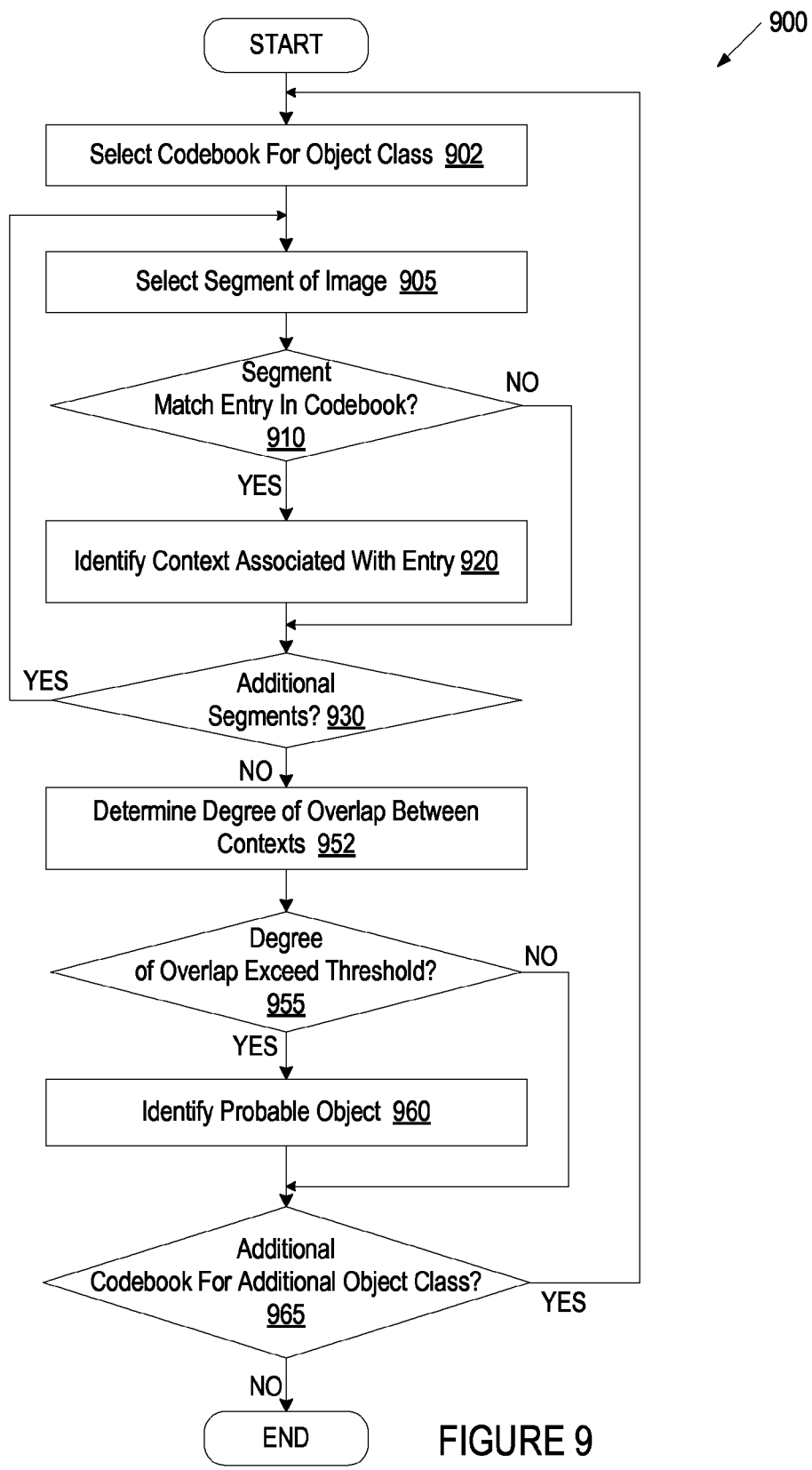
FIG. 9 is a flow diagram illustrating yet another embodiment for a method of performing object detection based on segment co-occurrence relationships.

FIG. 9 is a flow diagram illustrating yet another embodiment for a method 900 of performing object recognition based on segment co-occurrence relationships. In one embodiment, method 900 is performed at blocks 710 and/or 715 of method 700. At block 902 of method 900, processing logic selects a codebook for a particular object class. At block 905, processing logic selects a segment of an image (e.g., after segmentation has been performed on the image). At block 910, processing logic determines whether the segment matches an entry in the codebook. If the segment matches an entry in the codebook, the method continues to block 920. Otherwise, the method proceeds to block 930.

At block 920, processing logic identifies a context associated with the entry. The context may be defined by a sparse vector of other segments in the codebook. For example, if the codebook includes 1000 entries, then the sparse vector may have 1000 bits, where each bit represents a specific entry. If the bit associated with a particular code word has a 1 value, then the prototypical segment associated with that entry is in a segment's context. If the bit associated with a particular code word has a 0 value, then the prototypical segment associated with that entry is not in a segment's context.

At block 930, processing logic determines if there are any additional segments of the image that have not been compared to the codebook. If so, the method returns to block 905 and a new segment of the image is selected. Otherwise, the method continues to block 952.

At block 952, processing logic determines a degree of overlap between identified contexts. This may be performed by combining the contexts. At block 955, processing logic determines whether the degree of overlap exceeds a threshold. The degree of overlap may exceed the threshold, for example, if multiple segments predicted the same other segments. If the degree of overlap exceeds a threshold, the method continues to block 960 and a probable object is identified. If all or most segments within a region agree on a common context (i.e., they expect to occur in the presence of each other), it strengthens the prediction of the probable object. If the degree of overlap does not exceed the threshold, the method proceeds to block 965.

At block 965, processing logic determines whether there are any additional codebooks that segments of the image have not yet been compared to. Each codebook may be associated with a particular object class, and may be used to detect and recognize objects of that object class. If there is a codebook that segments of the image have not yet been compared to, the method returns to block 902 and a new codebook is selected. Otherwise, the method ends.

Figure 10:
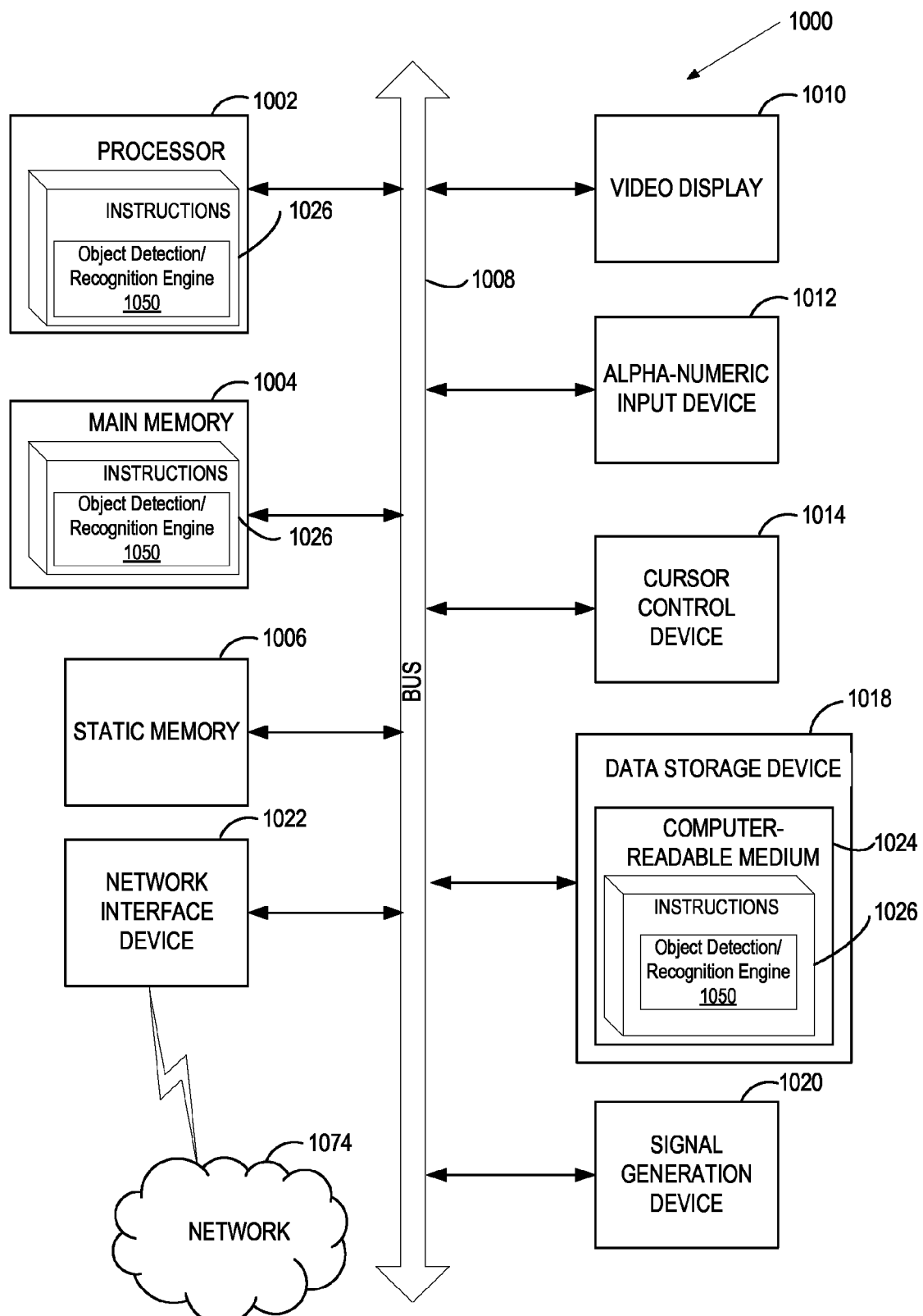
FIG. 10 is a block diagram of an exemplary computer system that may perform one or more of the operations described herein.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a computer-readable storage medium 1024 on which is stored one or more sets of instructions 1026 (e.g., software) embodying any one or more of the methodologies or functions described herein. The instructions 1026 may also reside, completely or at least partially, within the main memory 1004 and/or within the processor 1002 during execution thereof by the computer system 1000, the main memory 1004 and the processor 1002 also constituting computer-readable storage media. The instructions 1026 may further be transmitted or received over a network 1074 via the network interface device 1022.

In one embodiment, the instructions 1026 include instructions for an object detection/recognition engine 1050, which may correspond to object detection/recognition engine 305 of FIG. 3, and/or a software library containing methods that call an object detection/recognition engine. Alternatively, or in addition, instructions 1026 may include instructions for an object model creator (not shown) such as object model creator 205 of FIG. 2, and/or a software library containing methods that call an object model creator. While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   segmenting, by a computing device, an image into a plurality of segments, wherein each segment of the plurality of segments comprises a set of pixels that share visual characteristics;
   determining, by the computing device, expected contexts for the segments using context information pertaining to at least one other image, wherein an expected context for a segment comprises at least one of additional segments or features expected to occur in the image together with the segment; and
   identifying a probable object based on the expected contexts.

2. The method of claim 1, wherein determining an expected context for a segment comprises:
   maintaining a data structure storing the context information, wherein each entry in the data structure comprises a previously identified context for a respective previously identified segment from the at least one other image; and
   identifying, in the data structure, an entry of the plurality of entries that includes visual characteristics that most closely match visual characteristics of the segment, wherein the expected context is associated with the entry.

3. The method of claim 2, wherein the data structure is associated with a particular object class, and wherein identifying a probable object based on the expected contexts using the data structure further comprises determining that the probable object has the particular object class.

4. The method of claim 1, wherein determining an expected context for a segment comprises:
   determining a bounding box predicted by the segment; and
   determining at least one of additional segments or features expected to occur in the bounding box together with the segment.

5. The method of claim 1, wherein identifying the probable object based on the expected contexts comprises:
   determining a degree of overlap between the expected contexts of the segments; and
   identifying the probable object in response to determining that the degree of overlap exceeds a threshold.

6. The method of claim 1, wherein:
   segmenting the image comprises performing a hierarchical segmentation of the image, wherein first segments are components of a second segment higher in a segmentation hierarchy; and
   determining an expected context for the first segments comprises, for each first segment, determining other segments expected to be components of the second segment together with the first segment.

7. The method of claim 1, wherein the expected context for a segment further comprises probabilities that the additional segments or features will occur in the image together with the segment, and wherein identifying the probable object based on the expected contexts comprises combining the probabilities of the expected contexts for the segments.

8. The method of claim 1, further comprising:
   determining a subset of the plurality of segments that have overlapping contexts, wherein the subset of the plurality of segments predicts the probable object; and
   verifying the probable object based on performing object recognition using the subset of the plurality of segments.

9. A method comprising:
   receiving a training set of images;
   segmenting images of the training set, wherein segments comprise sets of pixels that share visual characteristics;
   determining contexts of the segments, wherein a context for a segment comprises at least one of additional segments or features that occurred in an image of the training set together with the segment;
   clustering the segments to determine prototypical segments; and
   generating, by a processing device, a data structure based on the clustering, wherein entries in the data structure represent the prototypical segments and comprise expected contexts for the prototypical segments, wherein the data structure is usable to identify probable objects in additional images.

10. The method of claim 9, wherein the data structure is a codebook, wherein each entry in the data structure is a code word for a prototypical segment, and wherein each code word comprises a sparse vector of additional prototypical segments that identifies which of the additional prototypical segments are expected to occur in images together with the prototypical segment.

11. The method of claim 9, further comprising:
   generating a plurality of data structures, wherein each data structure is for a different object class.

12. The method of claim 9, further comprising:
for each segment, determining probabilities for additional segments to occur in images together with the segment; and
weighting the additional segments in a context for the segment based on the probabilities.

13. A non-transitory computer readable storage medium having instructions that, when executed by a processing device, cause the processing device to perform a method comprising:
segmenting, by the processing device, an image into a plurality of segments, wherein each segment of the plurality of segments comprises a set of pixels that share visual characteristics;
determining, by the processing device, expected contexts for the segments using context information pertaining to at least one other image, wherein an expected context for a segment comprises at least one of additional segments or features expected to occur in the image together with the segment; and
identifying a probable object based on the expected contexts.

14. The computer readable storage medium of claim 13, wherein determining an expected context for a segment comprises:
maintaining a data structure storing the context information, wherein each entry in the data structure comprises a previously identified context for a respective previously identified segment from the at least one other image; and
identifying, in the data structure, an entry of the plurality of entries that includes visual characteristics that most closely match visual characteristics of the segment, wherein the expected context is associated with the entry.

15. The computer readable storage medium of claim 13, wherein the data structure is associated with a particular object class, and wherein identifying a probable object based on the expected contexts using the data structure further comprises determining that the probable object has the particular object class.

16. The computer readable storage medium of claim 13, wherein determining an expected context for a segment comprises:
determining a bounding box predicted by the segment; and
determining at least one of additional segments or features expected to occur in the bounding box together with the segment.

17. The computer readable storage medium of claim 13, wherein identifying the probable object based on the expected contexts comprises:
determining a degree of overlap between the expected contexts of the segments; and
identifying the probable object in response to determining that the degree of overlap exceeds a threshold.

18. The computer readable storage medium of claim 13, wherein:
segmenting the image comprises performing a hierarchical segmentation of the image, wherein first segments are components of a second segment higher in a segmentation hierarchy; and
determining an expected context for the first segments comprises, for each first segment, determining other segments expected to be components of the second segment together with the first segment.

19. The computer readable storage medium of claim 13, wherein the expected context for a segment further comprises probabilities that the additional segments or features will occur in the image together with the segment, and wherein identifying the probable object based on the expected contexts comprises combining the probabilities of the expected contexts for the segments.

20. The computer readable storage medium of claim 13, the method further comprising:
determining a subset of the plurality of segments that have overlapping contexts, wherein the subset of the plurality of segments predicts the probable object; and
verifying the probable object based on performing object recognition using the subset of the plurality of segments.

21. A non-transitory computer readable storage medium having instructions that, when executed by a processing device, cause the processing device to perform a method comprising:
receiving a training set of images;
segmenting images of the training set, wherein segments comprise sets of pixels that share visual characteristics;
determining contexts of the segments, wherein a context for a segment comprises at least one of additional segments or features that occurred in an image of the training set together with the segment;
clustering the segments to determine prototypical segments; and
generating, by the processing device, a data structure based on the clustering, wherein entries in the data structure represent the prototypical segments and comprise expected contexts for the prototypical segments, wherein the data structure is usable to identify probable objects in additional images.

22. The computer readable storage medium of claim 21, wherein the data structure is a codebook, wherein each entry in the data structure is a code word for a prototypical segment, and wherein each code word comprises a sparse vector of additional prototypical segments that identifies which of the additional prototypical segments are expected to occur in images together with the prototypical segment.

23. The computer readable storage medium of claim 21, the method further comprising:
generating a plurality of data structures, wherein each data structure is for a different object class.

24. The computer readable storage medium of claim 21, the method further comprising:
for each segment, determining probabilities for additional segments to occur in images together with the segment; and
weighting the additional segments in a context for the segment based on the probabilities.

25. A computing device comprising:
a memory; and
a processor coupled to the memory, wherein the processor is configured to:
segment an image into a plurality of segments, wherein each segment of the plurality of segments comprises a set of pixels that share visual characteristics;
determine expected contexts for the segments using context information pertaining to at least one other image, wherein an expected context for a segment comprises at least one of additional segments or features expected to occur in the image together with the segment; and
identify a probable object based on the expected contexts.

26. The computing device of claim 25, wherein determining an expected context for a segment comprises:
  maintaining a data structure storing the context information, wherein each entry in the data structure comprises a previously identified context for a respective previously identified segment from the at least one other image; and
  identifying, in the data structure, an entry of the plurality of entries that includes visual characteristics that most closely match visual characteristics of the segment, wherein the expected context is associated with the entry.

27. The computing device of claim 25, wherein determining an expected context for a segment comprises:
  determining a bounding box predicted by the segment; and
  determining at least one of additional segments or features expected to occur in the bounding box together with the segment.

28. The computing device of claim 25, wherein identifying the probable object based on the expected contexts comprises:
  determining a degree of overlap between the expected contexts of the segments; and
  identifying the probable object in response to determining that the degree of overlap exceeds a threshold.

29. The computing device of claim 25, wherein the expected context for a segment further comprises probabilities that the additional segments or features will occur in the image together with the segment, and wherein identifying the probable object based on the expected contexts comprises combining the probabilities of the expected contexts for the segments.

30. The computing device of claim 25, wherein the processor is further configured to:
  receive a training set of images;
  segment images of the training set;
  determine contexts of the segments;
  perform clustering on the segments to determine prototypical segments; and
  generate a data structure based on the clustering, wherein entries in the data structure represent the prototypical segments and comprise expected contexts for the prototypical segments, wherein the data structure is usable to identify probable objects in additional images.

31. The computing device of claim 30, wherein the data structure is a codebook, wherein each entry in the data structure is a code word for a prototypical segment, and wherein each code word comprises a sparse vector of additional prototypical segments that identifies which of the additional prototypical segments are expected to occur in images together with the prototypical segment.

32. The computing device of claim 30, wherein the processor is further configured to:
  for each segment, determine probabilities for additional segments to occur in images together with the segment; and
  weight the additional segments in a context for the segment based on the probabilities.

* * * * *